(12) United States Patent
Leung

(10) Patent No.: US 11,365,905 B2
(45) Date of Patent: Jun. 21, 2022

(54) ENERGY CONCENTRATING APPARATUS

(71) Applicant: ASIA PACIFIC MEGA TRADE LIMITED, Kowloon (HK)

(72) Inventor: Wai Man Leung, Kowloon (HK)

(73) Assignee: ASIA PACIFIC MEGA TRADE LIMITED, Kowloon (HK)

( * ) Notice: Subject to any disclaimer, the term of this patent is extended or adjusted under 35 U.S.C. 154(b) by 61 days.

(21) Appl. No.: 17/065,262

(22) Filed: Oct. 7, 2020

(65) Prior Publication Data

US 2021/0018226 A1 Jan. 21, 2021

Related U.S. Application Data

(63) Continuation of application No. PCT/CN2019/079650, filed on Mar. 26, 2019.

(30) Foreign Application Priority Data

Apr. 19, 2018 (CN) .......................... 201810353474.2

(51) Int. Cl.
*F24S 30/42* (2018.01)
*F24S 50/20* (2018.01)
*F24S 23/77* (2018.01)

(52) U.S. Cl.
CPC .............. *F24S 30/42* (2018.05); *F24S 23/77* (2018.05); *F24S 50/20* (2018.05)

(58) Field of Classification Search
CPC ...... F24S 50/20; F24S 50/00; F24S 2030/133; F24S 2030/136; F24S 2030/137; F24S 2030/145; F24S 30/42; F24S 30/455; H02S 20/30; H02S 20/32
See application file for complete search history.

(56) References Cited

U.S. PATENT DOCUMENTS

| | | | | | |
|---|---|---|---|---|---|
| 3,466,119 | A | * | 9/1969 | Francia | F24S 30/455 353/3 |
| 4,110,010 | A | * | 8/1978 | Hilton | F24S 30/40 136/246 |
| 5,325,844 | A | * | 7/1994 | Rogers | F24S 23/70 126/696 |
| 7,905,227 | B2 | * | 3/2011 | Luconi | F24S 25/65 126/684 |

(Continued)

FOREIGN PATENT DOCUMENTS

| CN | 101782283 A | * | 7/2010 | ............ F24J 2/38 |
|---|---|---|---|---|
| CN | 109871037 A | * | 6/2019 | ............ G05D 3/105 |

*Primary Examiner* — Jorge A Pereiro
*Assistant Examiner* — Nikhil P Mashruwala

(57) ABSTRACT

An energy concentrating apparatus includes: a mounting platform, a mounting support, a rotating support, a reflective mirror, an arc-shaped slide rail, a linking rod, a sliding parts, a drive device, and a pull rope. The mounting support is located on the mounting platform. A rotation shaft of each rotating support is rotatably located on the corresponding mounting support, and a rotation shaft of each reflective mirror is rotatably located on the corresponding rotating support. The arc-shaped slide rail is located on the mounting platform, and the sliding parts is slidably located in the arc-shaped slide rail, the linking rod is connected to the sliding parts and the reflective mirror respectively, and a curvature of the arc-shaped slide rail is different such that the reflective mirror rotates towards a different direction.

7 Claims, 16 Drawing Sheets

(56) References Cited

U.S. PATENT DOCUMENTS

2004/0031483 A1* 2/2004 Kinoshita ............... F24S 50/20
126/684
2011/0168160 A1* 7/2011 Martinez Moll ..... F24S 30/425
126/573

* cited by examiner

ENERGY CONCENTRATING APPARATUS

TECHNICAL FIELD

The present disclosure relates to an energy concentrating apparatus.

BACKGROUND

At present, an energy concentrating apparatus includes a planar structure and a plurality of reflective mirrors. The plurality of reflective mirrors are mounted on the planar structure. During operation, the planar structure tracks rotations from east to west of the sun, such that each reflective mirror tracks sun pitch angles in a fixed trajectory. However, during the tracking, each reflective mirror has a different two-dimensional rotation and rotation speed, and is hard to be controlled.

In addition, U.S. U.S. Pat. No. 6,820,611B2 has disclosed a moving member and a guiding member in a solar radiation concentrating method and apparatus, which are manufactured from single pieces, and are hard to manufacture in batches.

SUMMARY

A first technical solution according to the present disclosure is practiced by an energy concentrating apparatus. The energy concentrating apparatus includes:

a mounting platform and at least one set of mounting supports, wherein each set of the at least one set of the mounting supports is located on the mounting platform;

at least one rotating support and at least one reflective mirror, wherein a rotation shaft of each of the at least one reflective mirror is rotatably located on the corresponding mounting support, a rotation shaft of each of the at least one reflective mirror is rotatably located on the corresponding rotating support, and a shaft axis of the rotation shaft of the reflective mirror is perpendicular to a shaft axis of the rotation shaft of the rotating support such that the reflective mirror is omnidirectionally rotatable on the mounting support;

at least one arc-shaped slide rail, at least one linking rod, and at least one sliding parts, wherein each of the at least one arc-shaped slide rail is located on the mounting platform, each of the at least one sliding parts is slidably located in the corresponding arc-shaped slide rail, two ends of each of the at least one linking rod are respectively connected to the corresponding sliding parts and the corresponding reflective mirror such that the sliding parts drives the reflective mirror to rotate, and curvatures of two adjacent arc-shaped slide rails are different such that each of the at least one reflective mirror rotates towards a different direction to ensure that light reflected by each of the reflective mirror is reflected on an energy concentrating structure; and a drive device and at least one pull rope, wherein each of the at least one pull rope is fixedly connected to the corresponding sliding parts to drive the corresponding sliding parts to slide, each of the at least one pull rope is wound on a corresponding drive device such that the drive device pulls the pull rope to move.

In this technical solution, the rotation shafts of two adjacent rotating supports are movably connected.

In this technical solution, the energy concentrating apparatus further includes a fastening member, wherein the fastening member is located on the rotation shafts of the two adjacent rotating supports such that the rotation shafts of the two adjacent rotating supports are movably connected.

In this technical solution, the rotating support is in a cross shape, the rotating support is provided with a through hole, and an upper portion of the linking rod passes through the corresponding through hole.

In this technical solution, each of the at least one arc-shaped slide rail terminates at the end of a sun pitch angle.

In view of the above, a second technical solution according to the present disclosure is practiced by an energy concentrating apparatus. The energy concentrating apparatus includes:

a mounting platform and at least one set of mounting supports, wherein each set of the at least one set of the mounting supports is located on the mounting platform, and each set of the at least one set of the mounting supports is provided with a ball hole;

at least one arc-shaped slide rail, at least one linking rod, and at least one sliding parts, wherein each of the at least one arc-shaped slide rail is located on the mounting platform, each of the at least one sliding parts is slidably located in a corresponding arc-shaped slide rail, each of the at least one linking rods is provided with a ball, the ball is located in the corresponding ball hole and is rotatable in the ball hole, two ends of each of the at least one linking rod are respectively connected to the corresponding sliding parts and the corresponding reflective mirror such that the sliding parts drives the reflective mirror to rotate, and curvatures of two adjacent arc-shaped slide rails are different such that each of the at least one reflective mirror rotates towards a different direction to ensure that light reflected by each of the reflective mirror is reflected on an energy concentrating structure; and a drive device and at least one pull rope, wherein each of the at least one pull rope is fixedly connected to the corresponding sliding parts to drive the corresponding sliding parts to slide, each of the at least one pull rope is wound on a corresponding drive device such that the drive device pulls the pull rope to move.

In this technical solution, each of the at least one arc-shaped slide rail terminates at the end of a sun pitch angle.

DETAILED DESCRIPTION

Figure 1:
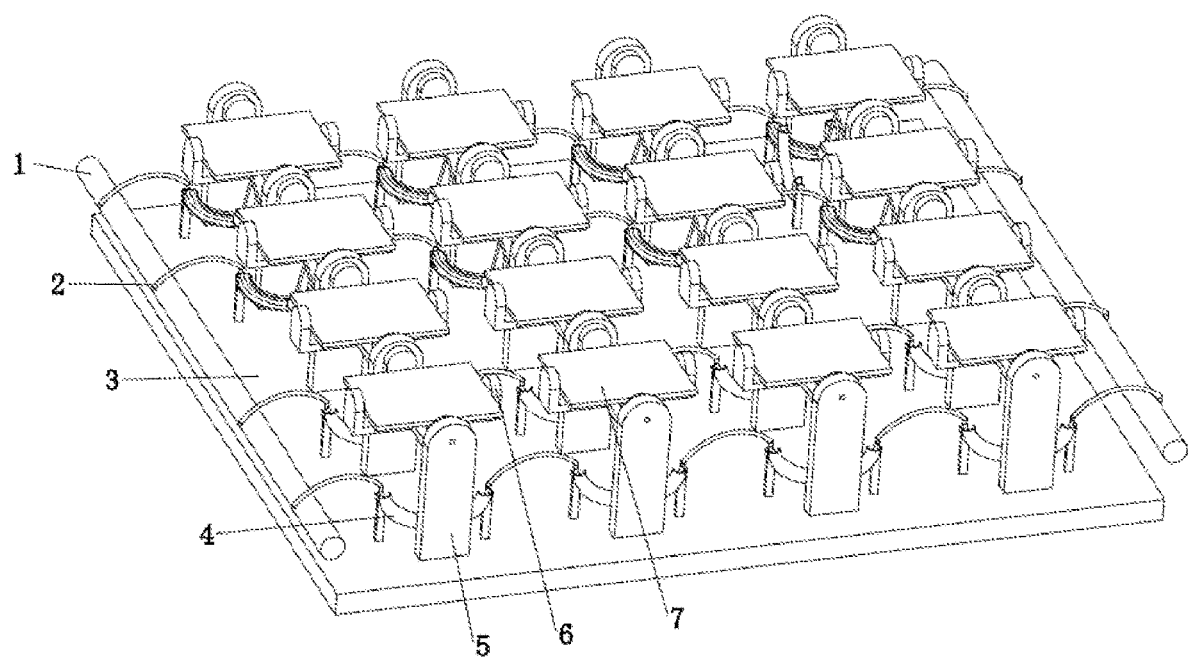
FIG. 1 is a three-dimensional view of an energy concentrating apparatus according to a first embodiment of the present disclosure.
Figure 2:
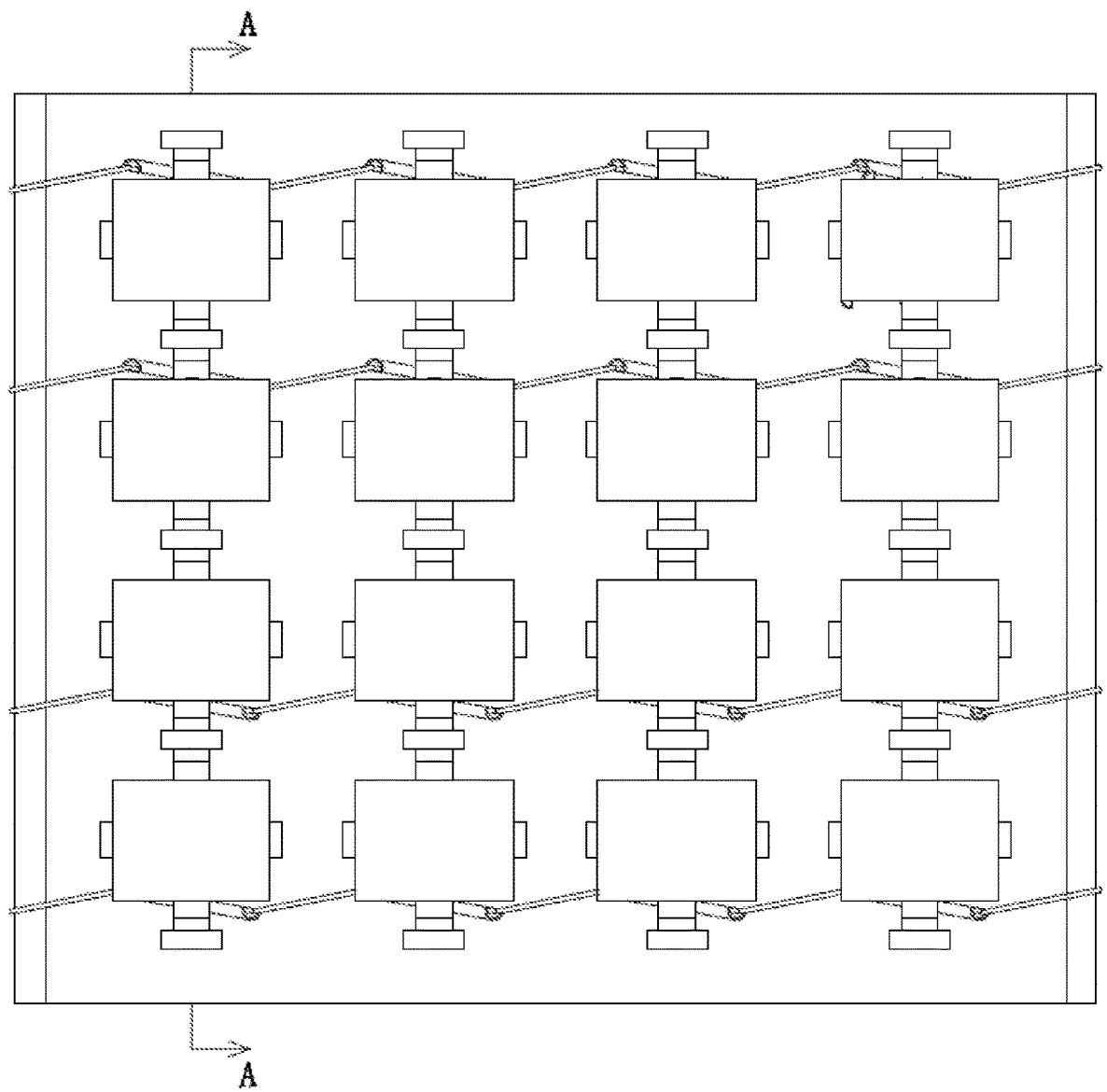
FIG. 2 is a top view of the energy concentrating apparatus according to the first embodiment of the present disclosure.
Figure 3:
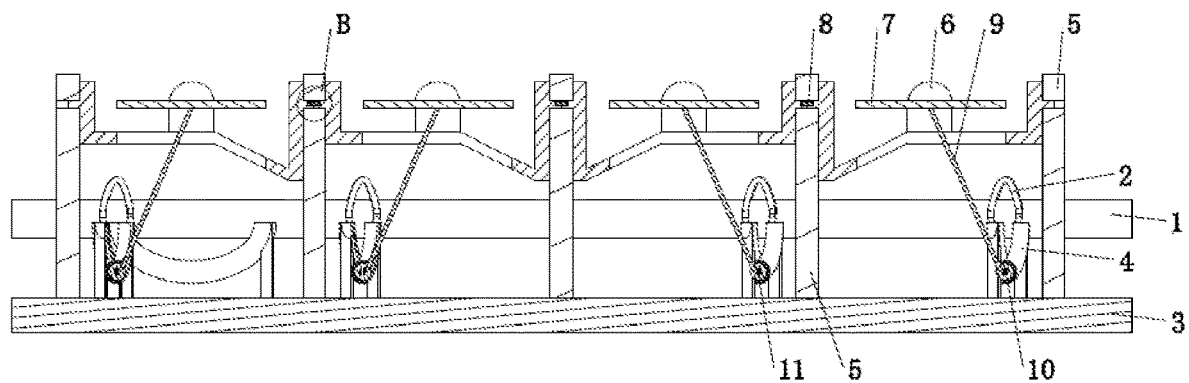
FIG. 3 is a perspective view taken along an A-A side of the energy concentrating apparatus in FIG. 2.
Figure 4:
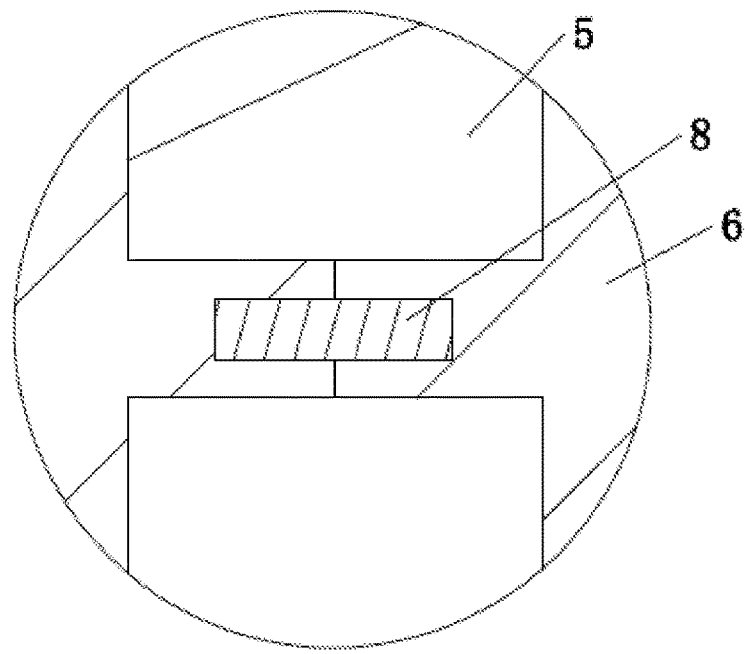
FIG. 4 is an enlarged view of part B in FIG. 3.
Figure 5:
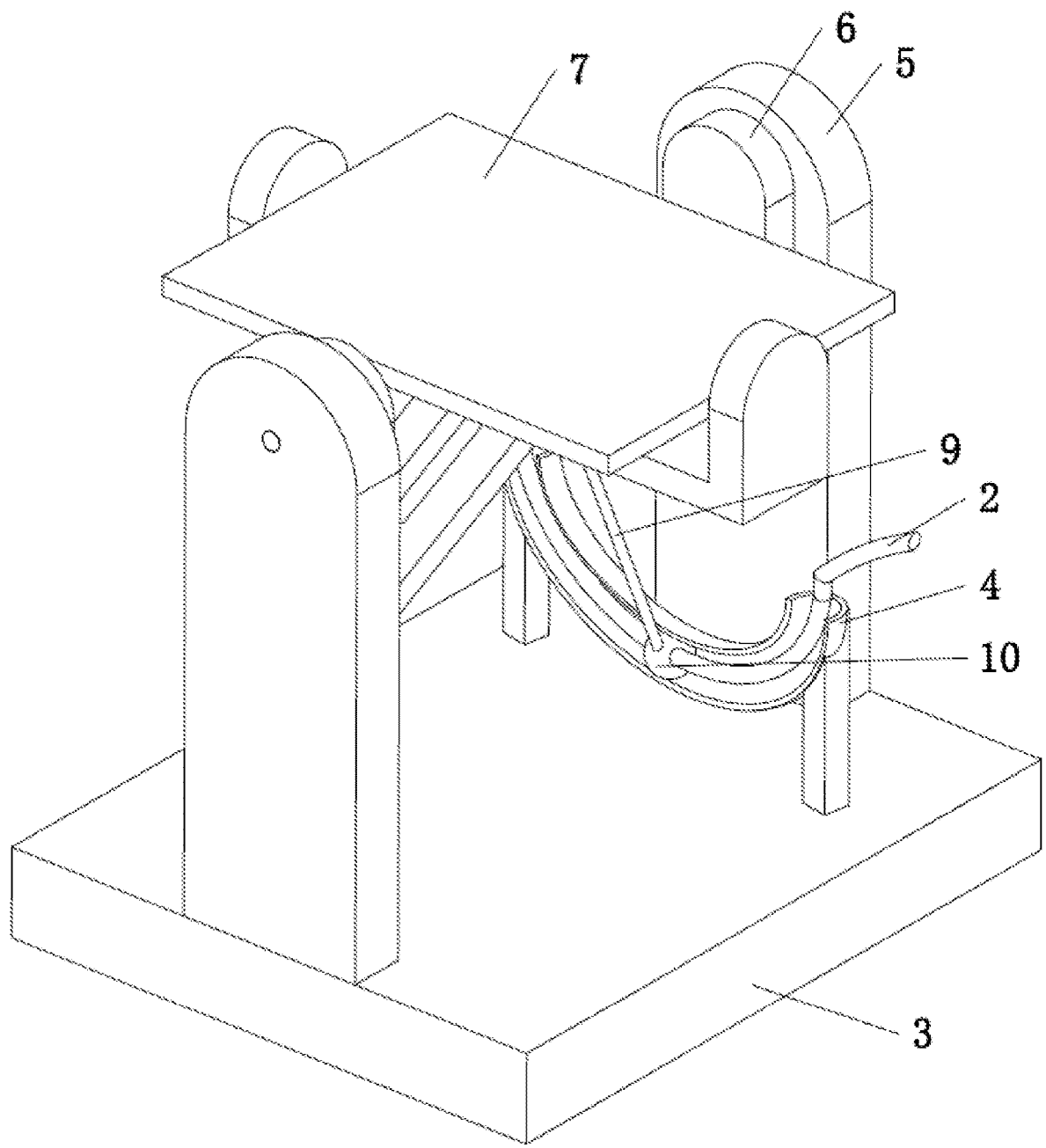
FIG. 5 is a three-dimensional view of a set of reflecting devices with a mounting platform removed according to the first embodiment of the present disclosure.
Figure 6:
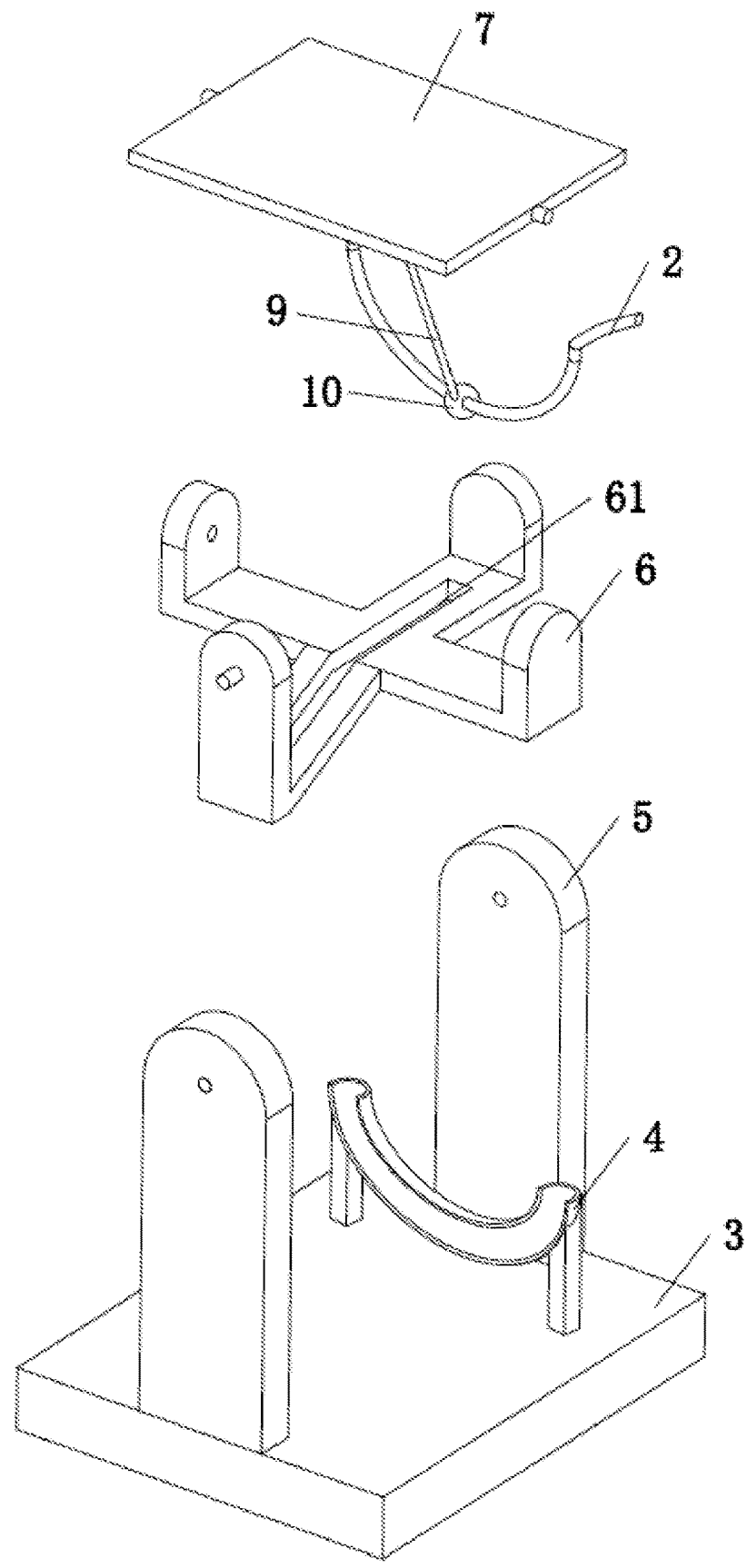
FIG. 6 is an exploded view of FIG. 5.

The present disclosure is further described with reference to and the attached drawings and specific embodiments. It should be noted herein that description of these embodiments is intended to help understanding of the present disclosure, instead of construing any limitation to the present disclosure. In addition, technical features involved in various embodiments of the present disclosure described hereinafter may be combined as long as these technical features are not in conflict.

First Embodiment

As illustrated in FIG. 1 to FIG. 6, an energy concentrating apparatus includes:

a mounting platform 3 and at least one set of mounting supports 5, wherein each set of the at least one set of the mounting supports 5 is located on the mounting platform 3;

at least one rotating support 6 and at least one reflective mirror 7, wherein a rotation shaft of each of the at least one reflective mirror 6 is rotatably located on the corresponding mounting support 5, a rotation shaft of each of the at least one reflective mirror 7 is rotatably located on the corresponding rotating support 6, and a shaft axis of the rotation shaft of the reflective mirror 7 is perpendicular to a shaft axis of the rotation shaft of the rotating support 6 such that the reflective mirror 7 is omnidirectionally rotatable on the mounting support 3;

at least one arc-shaped slide rail 4, at least one linking rod 9, and at least one sliding parts 10, wherein each of the at least one arc-shaped slide rail 4 is located on the mounting platform 3, each of the at least one sliding parts 10 is slidably located in the corresponding arc-shaped slide rail 4, two ends of each of the at least one linking rod 9 are respectively connected to the corresponding sliding parts 10 and the corresponding reflective mirror 7 such that the sliding parts 10 drives the reflective mirror 7 to rotate, and curvatures of two adjacent arc-shaped slide rails 4 are different such that each of the at least one reflective mirror 7 rotates towards a different direction to ensure that light reflected by each of the reflective mirror 7 is reflected on an energy concentrating structure, the sliding parts 10 is a slide block or a pulley; and a drive device 1 and at least one pull rope 2, wherein each of the at least one pull rope 2 is fixedly connected to a corresponding sliding parts 10 to drive the corresponding sliding parts 10 to slide, each of the at least one pull rope 2 is wound on the corresponding drive device 1 such that the drive device 1 pulls the pull rope 2 to move, the pull rope 2 is a chain or a belt.

During operation, since the curvature of each of the at least one arc-shaped slide rail 4 is different, each of the at least one reflective mirror 7 rotates at a different angle, and each of the at least one reflective mirror 7 rotates at a corresponding angle such that the reflected energy is concentrated on the energy concentrating structure.

In this embodiment, the rotation shafts of two adjacent rotating supports 6 are movably connected. During operation, the two adjacent rotating supports 6 rotates at different speeds, and thus the two rotating supports 6 are movably connected. The rotation shafts are movably connected to improve left-right perpendicularity and location positioning, and enhance rigidity of the structure.

In this embodiment, the energy concentrating apparatus further includes a fastening member 8, wherein the fastening member 8 is located on the rotation shafts of the two adjacent rotating supports 6 such that the rotation shafts of the two adjacent rotating supports 6 are movably connected.

In this embodiment, the rotating support 6 is in a cross shape, the rotating support 6 is provided with a through hole 61, and an upper portion of the linking rod 9 passes through the corresponding through hole 61.

In this embodiment, each of the at least one arc-shaped slide rail 4 terminates at the end of a sun pitch angle.

Figure 7:
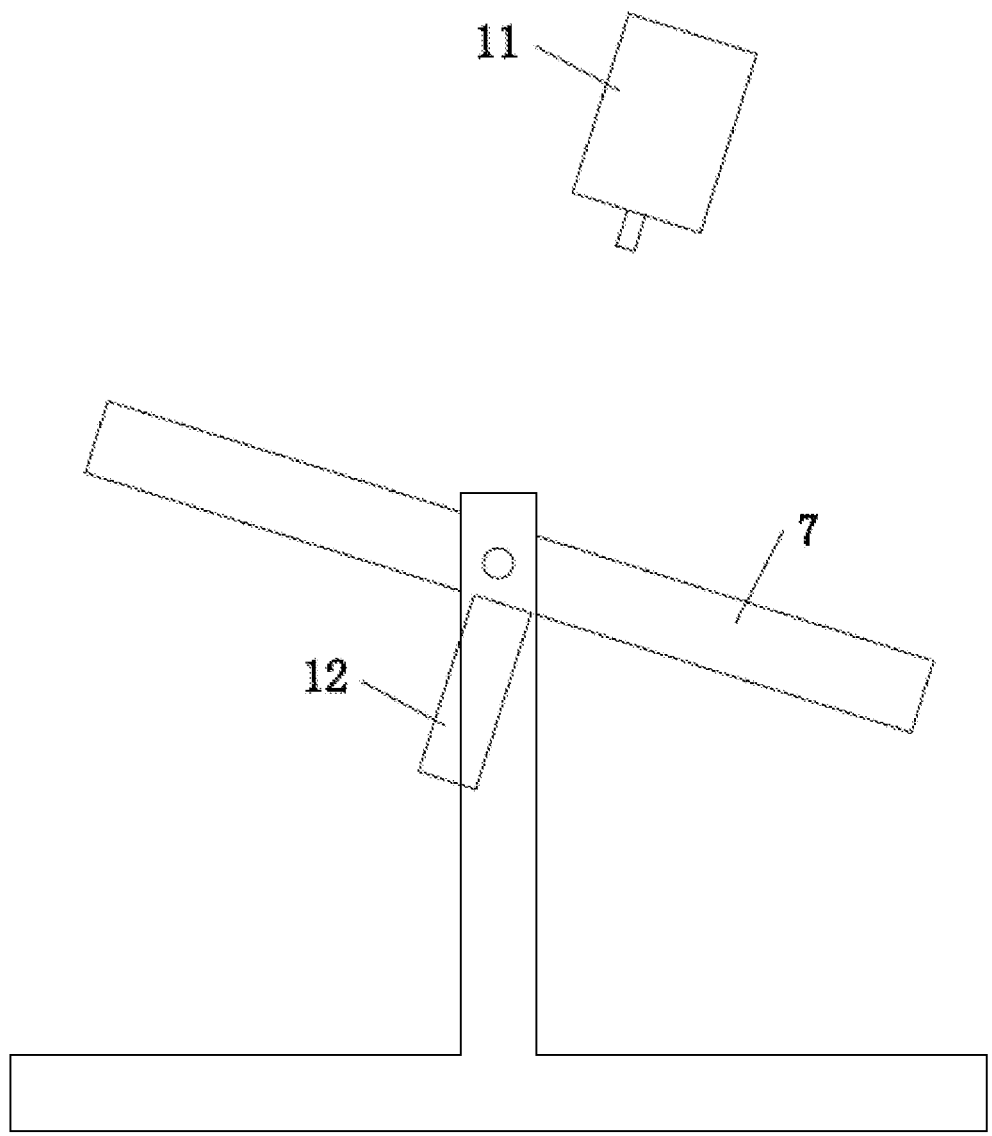
FIG. 7 is a schematic structural view of a device for determining a curvature of a slide rail according to the first embodiment of the present disclosure.
Figure 8:
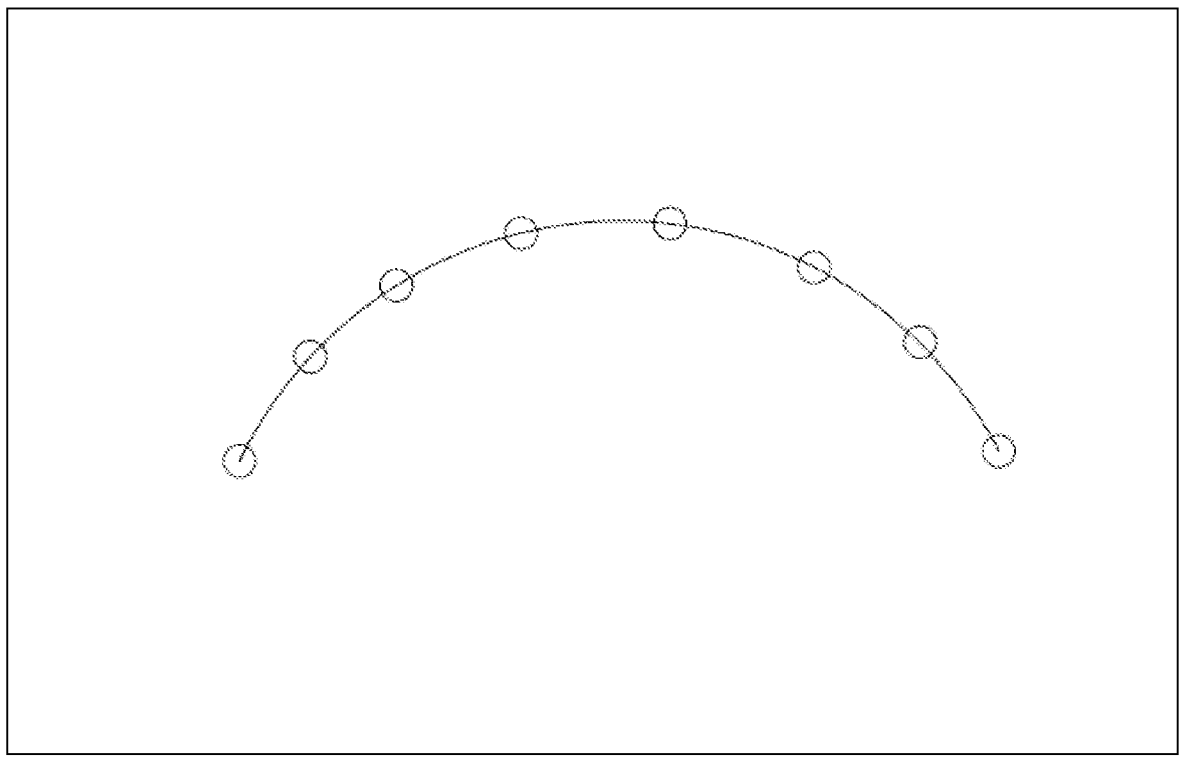
FIG. 8 is a top view of scale paper according to the first embodiment of the present disclosure.
Figure 9:
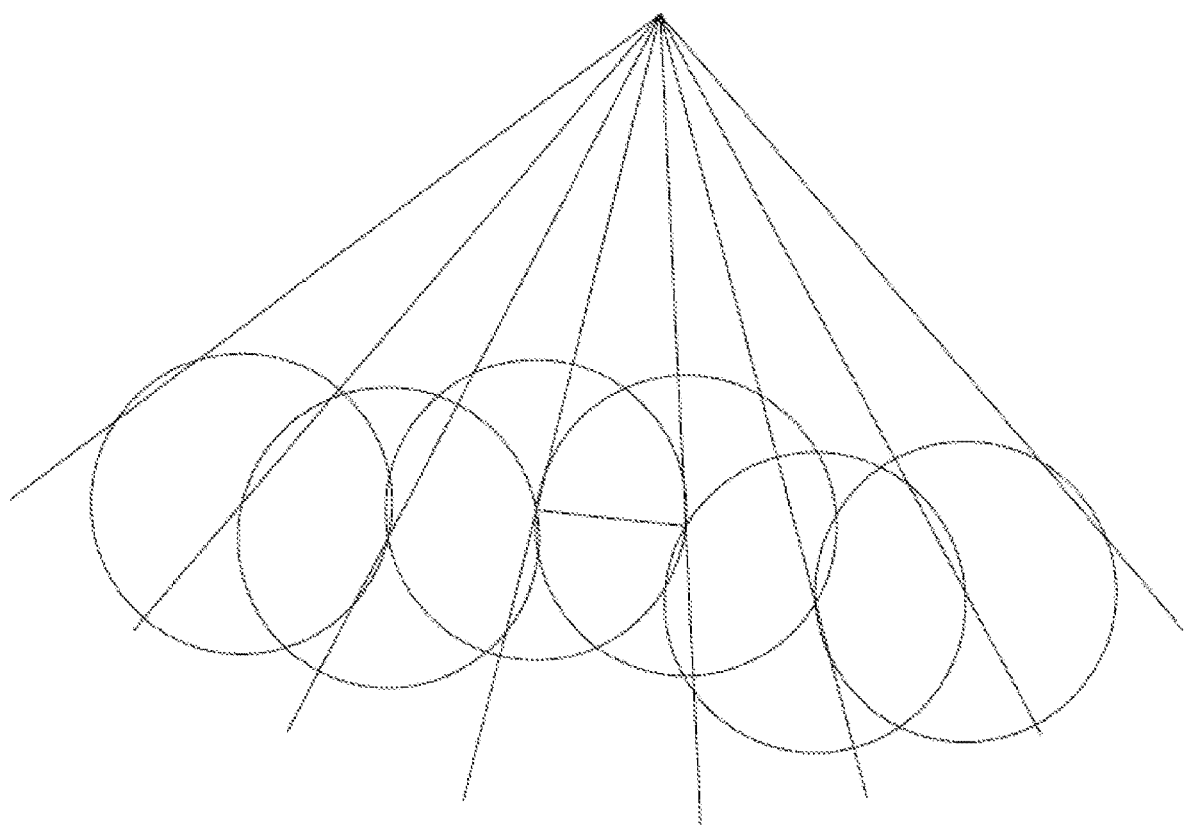
FIG. 9 is a schematic view of determining a curvature of a perpendicular surface of the slide rail according to the first embodiment of the present disclosure.
Figure 10:
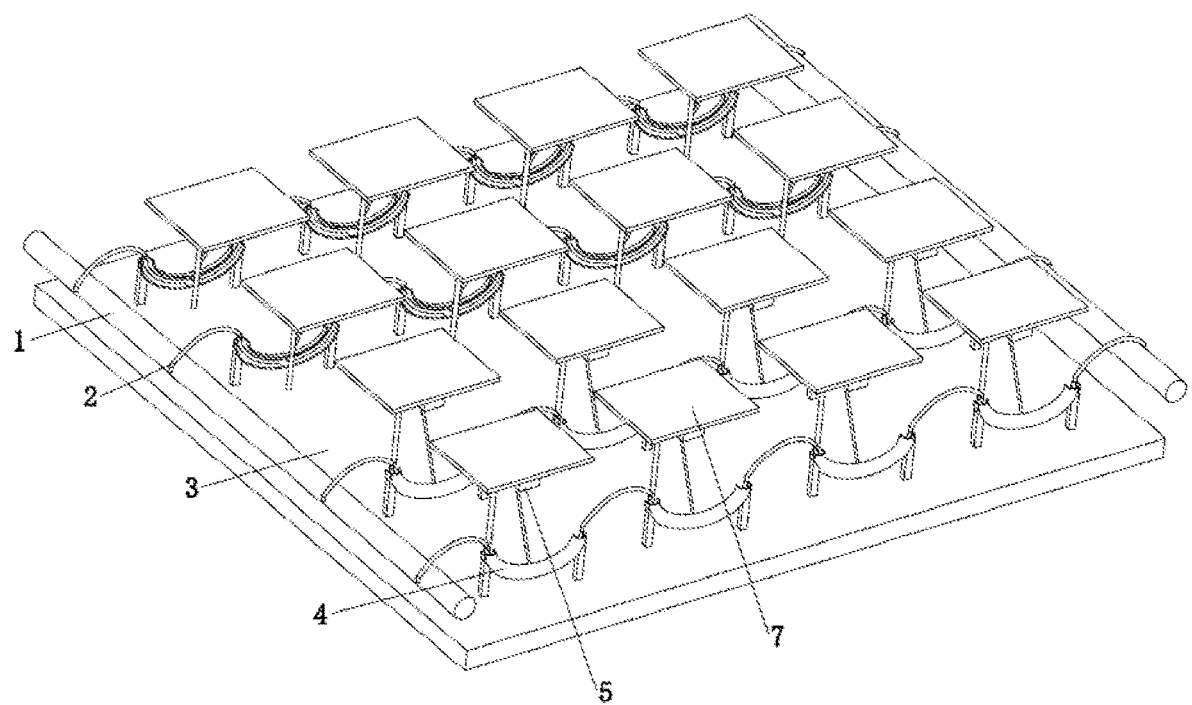
FIG. 10 is a three-dimensional view of an energy concentrating apparatus according to a second embodiment of the present disclosure.
Figure 11:
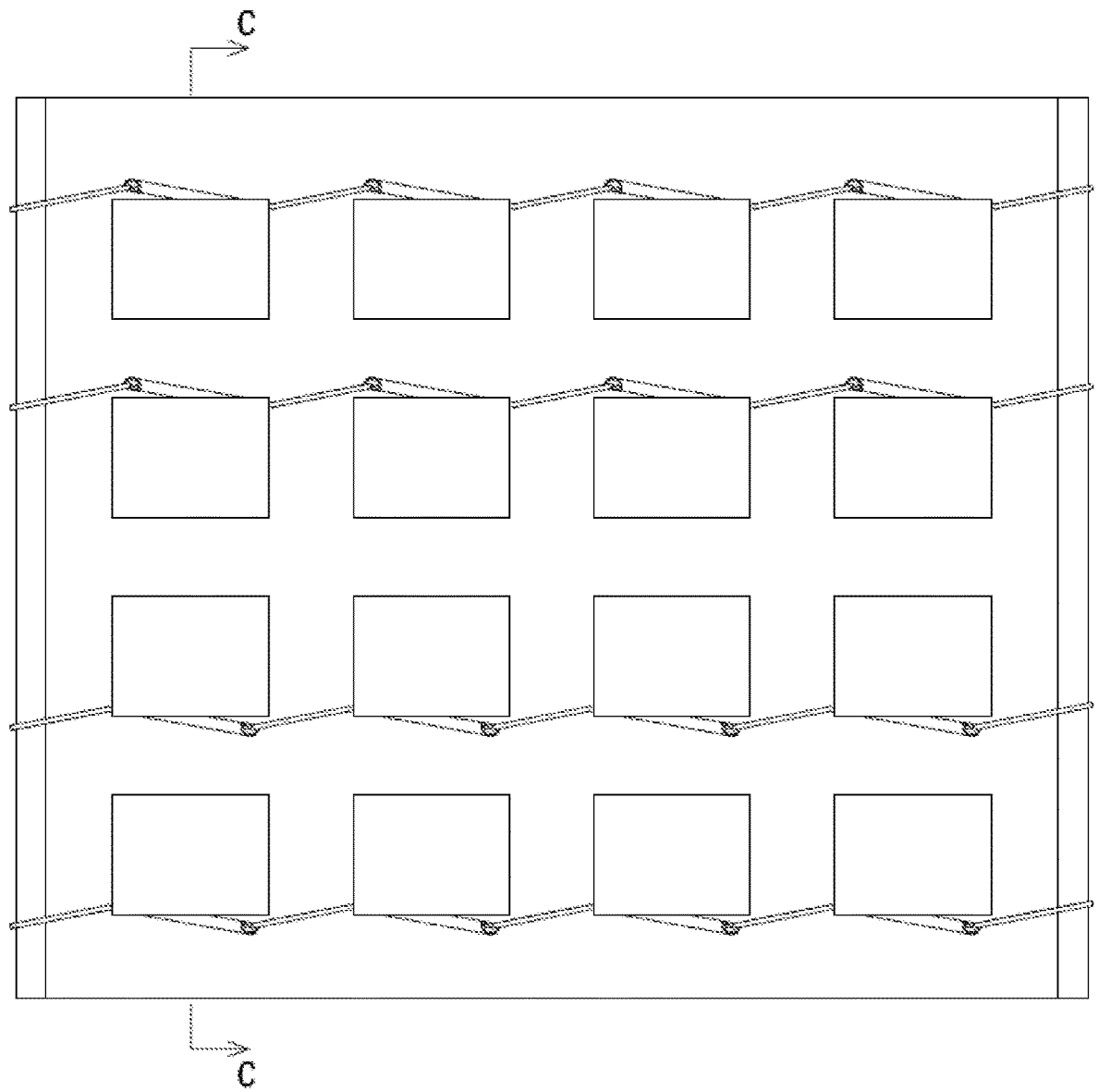
FIG. 11 is a top view of the energy concentrating apparatus according to the second embodiment of the present disclosure.
Figure 12:
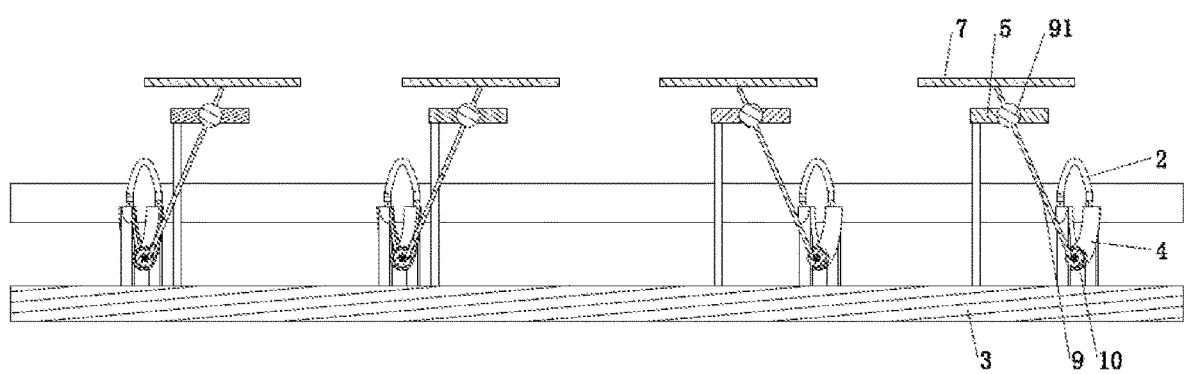
FIG. 12 is a perspective view taken along a C-C side of the energy concentrating apparatus in FIG. 11.
Figure 13:
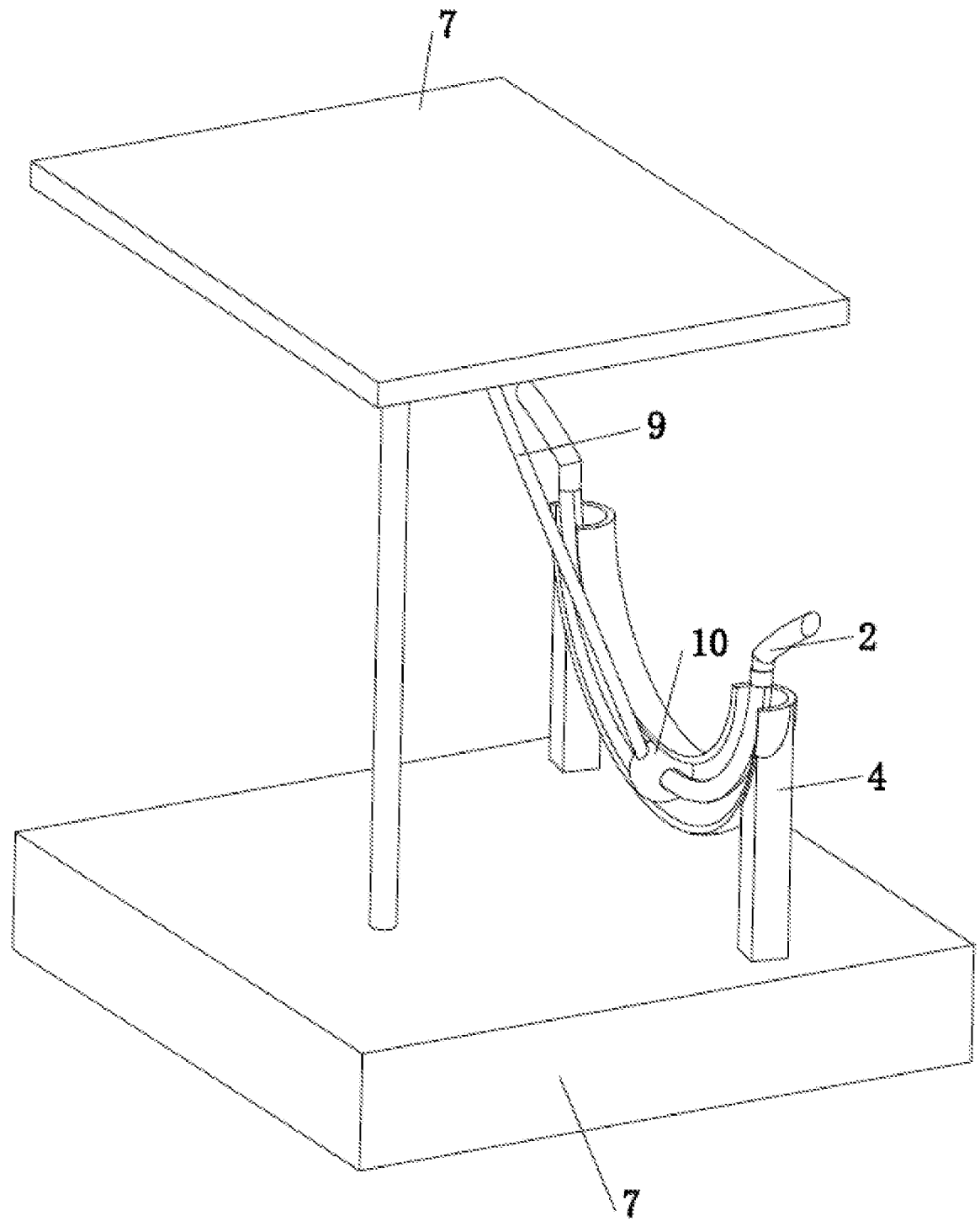
FIG. 13 is a three-dimensional view of a set of reflecting devices with a mounting platform removed according to the second embodiment of the present disclosure.
Figure 14:
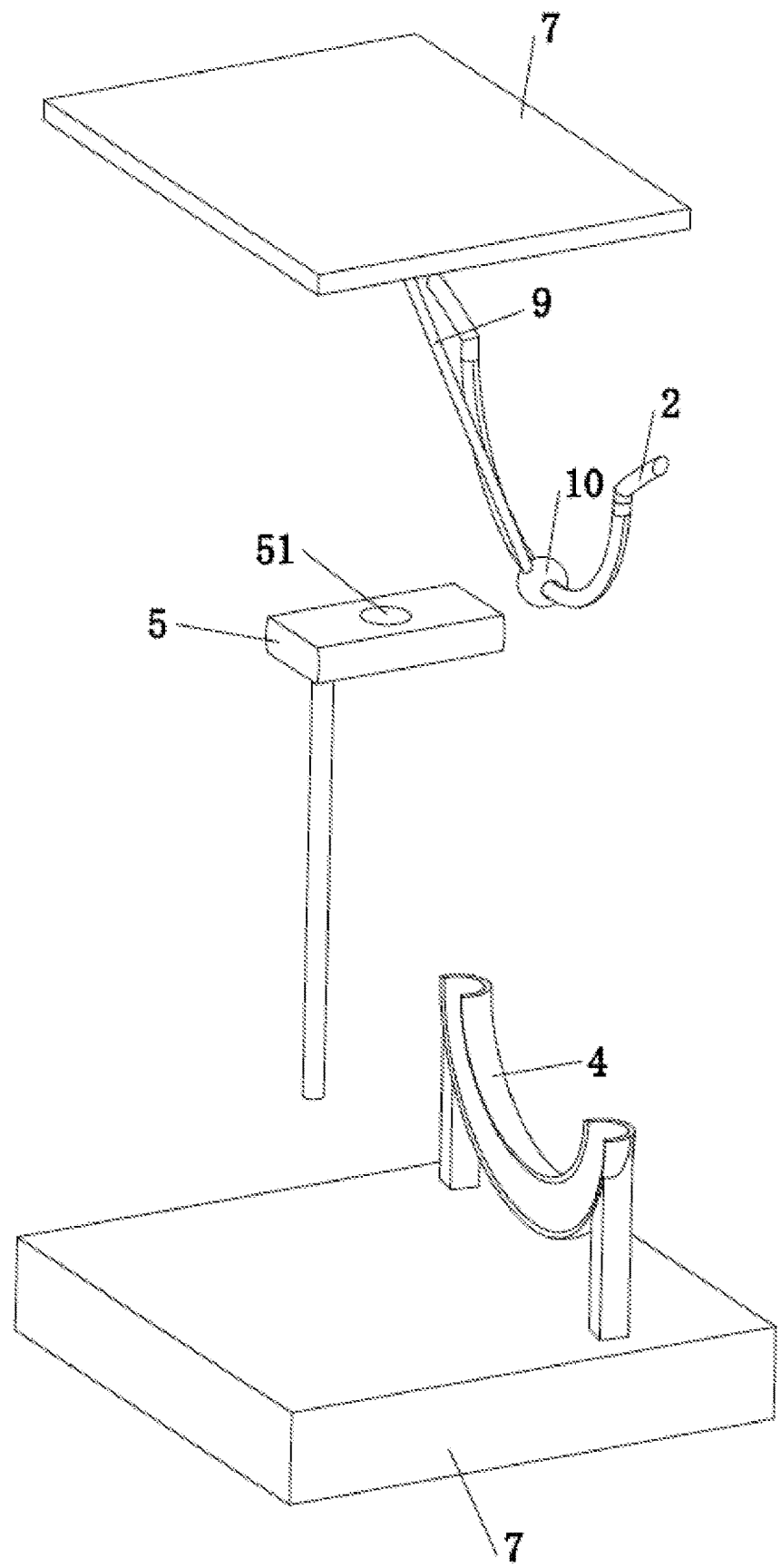
FIG. 14 is an exploded view of FIG. 13.

As illustrated in FIG. 7 to FIG. 9, a method for determining a curvature of the arc-shaped slide rail 4 includes the following steps:

In step 1, a laser angle meter 11 is adjusted, such that a laser emitted from the laser angle meter 11 is irradiated at a center of a front surface of the reflective mirror 7.

In step 2, a laser normal trajectory plotter 12 is located at a center of a rear side of the reflective mirror 7; in this case, the laser emitted from the laser angle meter 11, the shaft axis of the rotation shaft, and the laser normal tracker are coaxial and concentric.

In step 3, the laser angle meter 11 is rotated within the range of 0 to 90 degrees, the laser emitted from the laser angle meter 11 is maintained at the center of the front side of the reflective mirror 7, the reflective mirror 7 is rotated while the laser angle meter 11 is rotated such that the light reflected by the reflective mirror 7 is reflected to the energy concentrating structure, laser dots emitted from the laser normal trajectory plotter 12 define a normal trajectory, and the trajectory at each degree is recorded on scale paper.

In step 4, the record of the dots on the scale paper is a horizontal curvature of the arc-shaped slide rail 4.

In step 5, a method for determining a perpendicular curvature of the arc-shaped slide rail 4 includes the following steps: rays emitted from the laser normal trajectory plotter 12 are recorded, the recorded laser normal forms a plurality of included angles on a perpendicular surface, an isosceles triangle is drawn by using a minimum included angle, a circle is drawn using a base angle of the isosceles triangle as a center of circle, the radius of the circle is equal to the length of the base side the isosceles triangle, the drawn circle is intersected with the adjacent rays, a circle is then drawn using a lower intersection point as a center of circle, the radius of the circles are equal, the circle is intersected with the adjacent rays, another circle is drawn using a lower intersection point as a center of circle, such steps are repeated to draw a plurality of circles, an arc line formed by connecting the centers of circle of all the circles is the curvature of the perpendicular surface of the arc-shaped slide rail 4, the curvature of the corresponding arch-shaped slide rail 4 is obtained by combining the curvature of the horizontal surface of the arc-shaped slide rail 4 with the curvature of the perpendicular surface.

Alternatively, coordinates of all the dots on the scale paper are input by using computer aided design (CAD) software, each of the dots is connected to the center of the rear surface of the reflective mirror 7 to form a line such that a three-dimensional fan ray pattern is formed, an isosceles triangle is drawn by using a minimum included angle, a circle is drawn using a base angle of the isosceles triangle as a center of circle, the radius of the circle is equal to the length of the base side the isosceles triangle, the drawn circle is intersected with the adjacent rays, a circle is then drawn using a lower intersection point as a center of circle, the radius of the circles are equal, the circle is intersected with the adjacent rays, another circle is drawn using a lower intersection point as a center of circle, such steps are repeated to draw a plurality of circles, an arc line formed by connecting the centers of circle of all the circles is the curvature of the arc-shaped slide rail 4.

Second Embodiment

As illustrated in FIG. 10 to FIG. 14, an energy concentrating apparatus includes:

a mounting platform 3 and at least one set of mounting supports 5, wherein each set of the at least one set of the mounting supports 5 is located on the mounting platform 3, and each set of the at least one set of the mounting supports 5 is provided with a ball hole 51;

at least one arc-shaped slide rail 4, at least one linking rod 9, and at least one sliding parts 10, wherein each of the at least one arc-shaped slide rail 4 is located on the mounting platform 3, each of the at least one sliding parts 10 is slidably located in a corresponding arc-shaped slide rail 4, each of the at least one linking rods 9 is provided with a ball 91, the ball 91 is located in the corresponding ball hole 51 and is rotatable in the ball hole 51, two ends of each of the at least one linking rod 9 are respectively connected to the sliding parts 10 and the reflective mirror 7 such that the sliding parts 10 drives the reflective mirror 7 to rotate, and each of the at least one arc-shaped slide rail 4 has a different curvature such that each of the at least one reflective mirror 7 rotates towards a different direction to ensure that light reflected by each of the reflective mirror 7 is reflected on an energy concentrating structure, the sliding parts 10 is a slide block or a pulley; and a drive device 1 and at least one pull rope 2, wherein each of the at least one pull rope 2 is fixedly connected to a corresponding sliding parts 10 to drive the corresponding sliding parts 10 to slide, each of the at least one pull rope 2 is wound on the corresponding drive device 1 such that the drive device 1 pulls the pull rope 2 to move.

In this embodiment, each of the at least one arc-shaped slide rail 4 terminates at the end of a sun pitch angle.

Figure 15:
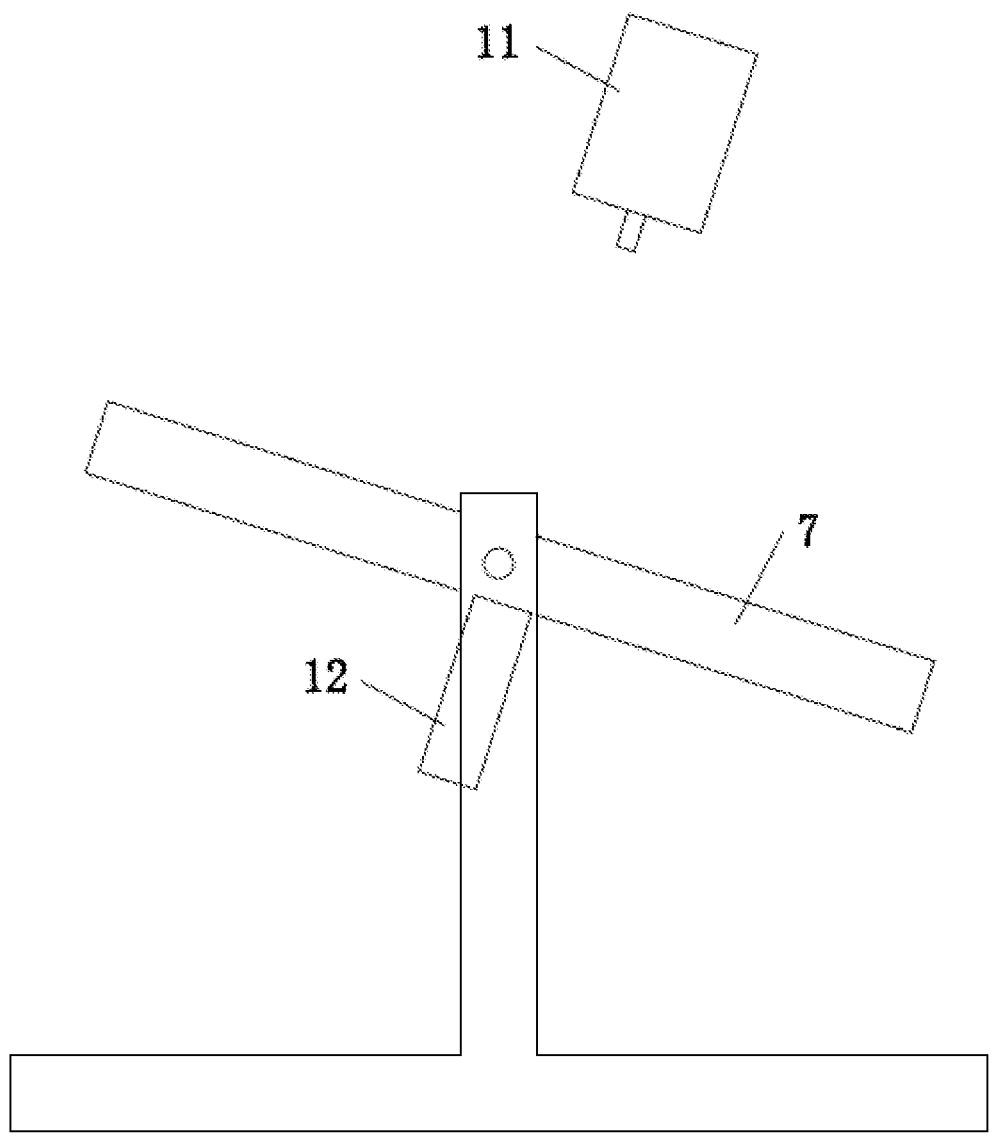
FIG. 15 is a schematic structural view of a device for determining a curvature of a slide rail according to the second embodiment of the present disclosure.
Figure 16:
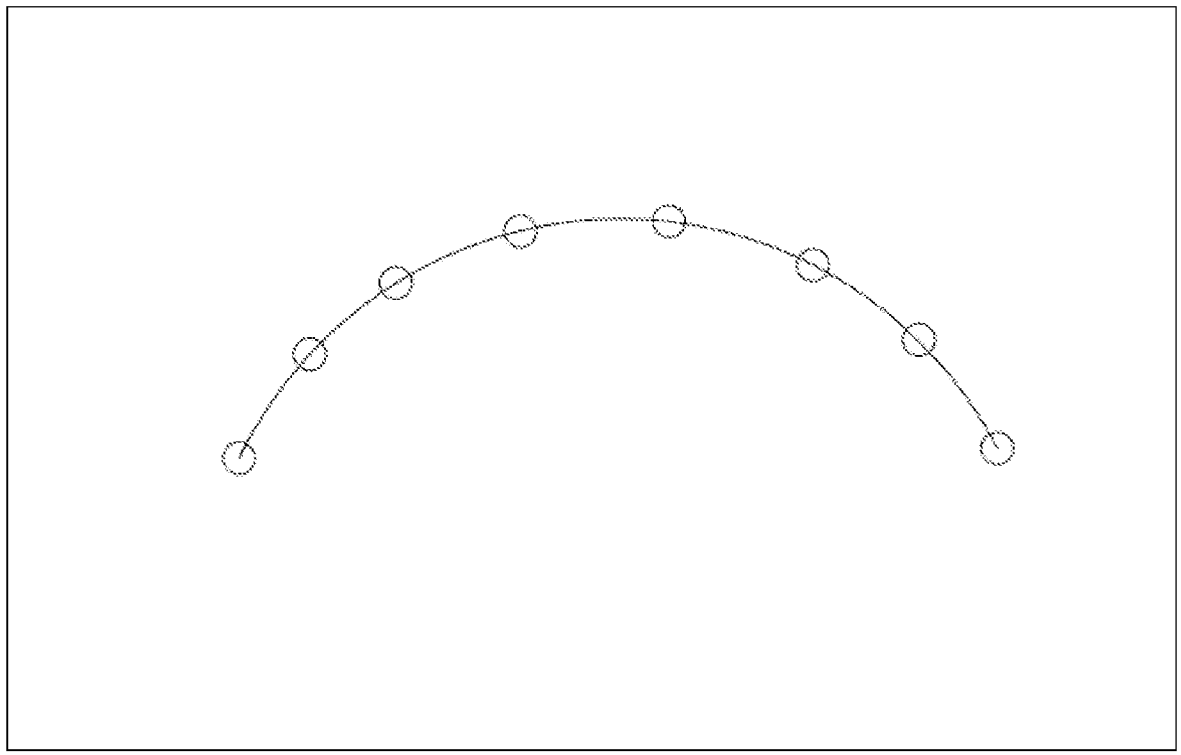
FIG. 16 is a top view of scale paper according to the second embodiment of the present disclosure.
Figure 17:
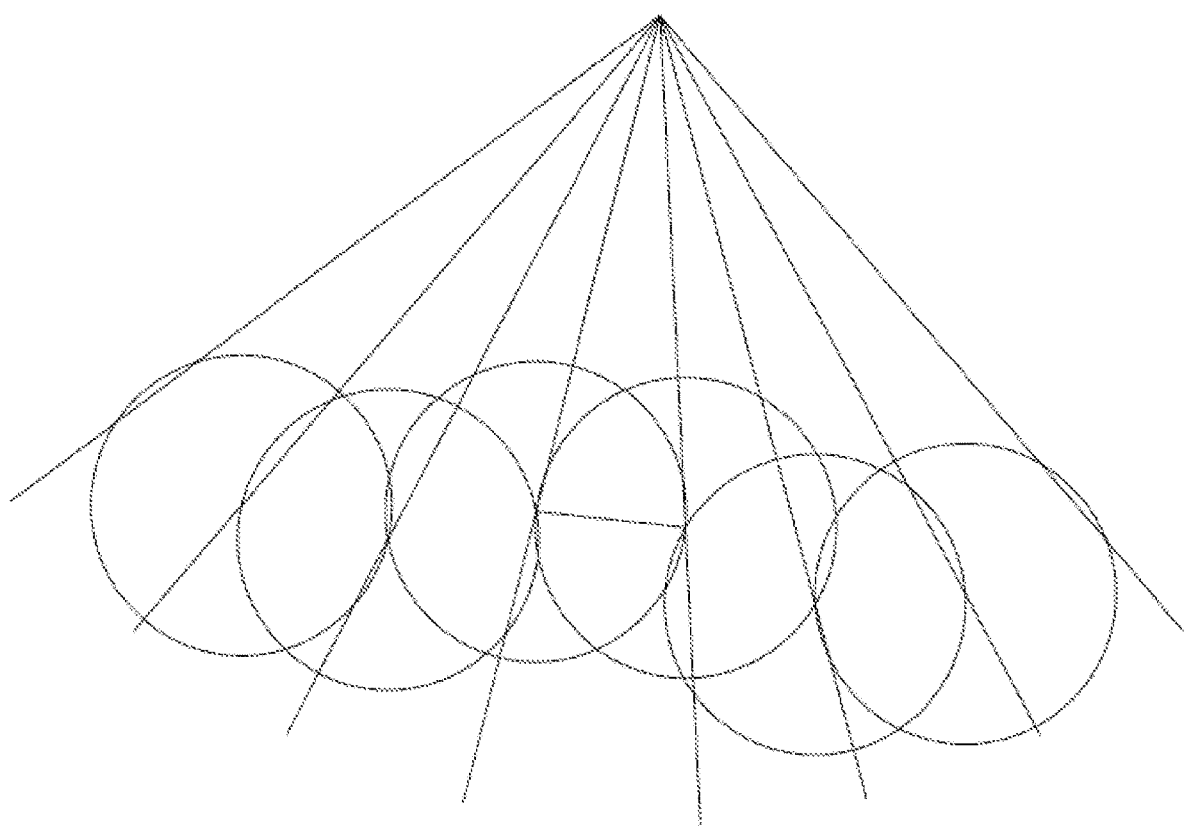
FIG. 17 is a schematic view of determining a curvature of a perpendicular surface of the slide rail according to the second embodiment of the present disclosure.

As illustrated in FIG. 15 to FIG. 17, a method for determining a curvature of the arc-shaped slide rail 4 includes the following steps:

In step 1, a laser angle meter 11 is adjusted, such that a laser emitted from the laser angle meter 11 is irradiated at a center of a front surface of the reflective mirror 7.

In step 2, a laser normal trajectory plotter 12 is located at a center of a rear side of the reflective mirror 7; in this case, the laser emitted from the laser angle meter 11, the shaft axis of the rotation shaft, and the laser normal tracker are coaxial and concentric.

In step 3, the laser angle meter 11 is rotated within the range of 0 to 90 degrees, the laser emitted from the laser angle meter 11 is maintained at the center of the front side of the reflective mirror 7, the reflective mirror 7 is rotated while the laser angle meter 11 is rotated such that the light reflected by the reflective mirror 7 is reflected to the energy concentrating structure, laser dots emitted from the laser normal trajectory plotter 12 define a normal trajectory, and the trajectory at each degree is recorded on scale paper.

In step 4, the record of the dots on the scale paper is a horizontal curvature of the arc-shaped slide rail 4.

In step 5, a method for determining a perpendicular curvature of the arc-shaped slide rail 4 includes the following steps: rays emitted from the laser normal trajectory plotter 12 are recorded, the recorded laser normal forms a plurality of included angles on a perpendicular surface, an isosceles triangle is drawn by using a minimum included angle, a circle is drawn using a base angle of the isosceles triangle as a center of circle, the radius of the circle is equal to the length of the base side the isosceles triangle, the drawn circle is intersected with the adjacent rays, a circle is then drawn using a lower intersection point as a center of circle, the radius of the circles are equal, the circle is intersected with the adjacent rays, another circle is drawn using a lower intersection point as a center of circle, such steps are repeated to draw a plurality of circles, an arc line formed by connecting the centers of circle of all the circles is the curvature of the perpendicular surface of the arc-shaped slide rail 4, the curvature of the corresponding arch-shaped slide rail 4 is obtained by combining the curvature of the horizontal surface of the arc-shaped slide rail 4 with the curvature of the perpendicular surface.

Alternatively, coordinates of all the dots on the scale paper are input by using CAD software, each of the dots is connected to the center of the rear surface of the reflective mirror 7 to form a line such that a three-dimensional fan ray pattern is formed, an isosceles triangle is drawn by using a minimum included angle, a circle is drawn using a base angle of the isosceles triangle as a center of circle, the radius of the circle is equal to the length of the base side the isosceles triangle, the drawn circle is intersected with the adjacent rays, a circle is then drawn using a lower intersection point as a center of circle, the radius of the circles are equal, the circle is intersected with the adjacent rays, another circle is drawn using a lower intersection point as a center of circle, such steps are repeated to draw a plurality of circles, an arc line formed by connecting the centers of circle of all the circles is the curvature of the arc-shaped slide rail 4.

The embodiments of the present disclosure are described in detail with reference to the accompanying drawings. However, the present disclosure is not limited to the embodiments described. For a person skilled in the art would derive various modifications, variations and replacements made to the embodiments without departing from the principle and spirit of the present disclosure shall all fall within the protection scope of the present disclosure.

What is claimed is:

1. An energy concentrating apparatus, comprising:
a mounting platform and at least one set of mounting supports, wherein each set of the at least one set of the mounting supports is located on the mounting platform;
at least one rotating support and at least one reflective mirror, wherein a rotation shaft of each of the at least one rotating support is rotatably located on the corresponding mounting support, a rotation shaft of each of the at least one reflective mirror is rotatably located on the corresponding rotating support, and a shaft axis of the rotation shaft of the reflective mirror is perpendicular to a shaft axis of the rotation shaft of the rotating support such that the reflective mirror is omnidirectionally rotatable on the mounting support;

at least one arc-shaped slide rail, at least one linking rod, and at least one sliding parts, wherein each of the at least one arc-shaped slide rail is located on the mounting platform, each of the at least one sliding parts is slidably located in the corresponding arc-shaped slide rail, two ends of each of the at least one linking rod are respectively connected to the corresponding sliding parts and the corresponding reflective mirror such that the sliding parts drives the reflective mirror to rotate, and curvatures of two adjacent arc-shaped slide rails are different such that each of the at least one reflective mirror rotates towards a different direction to ensure that light reflected by each of the reflective mirror is reflected on an energy concentrating structure; and a drive device and at least one pull rope, wherein each of the at least one pull rope is fixedly connected to the corresponding sliding parts to drive the corresponding sliding parts to slide, each of the at least one pull rope is wound on a corresponding drive device such that the drive device pulls the pull rope to move.

2. The energy concentrating apparatus according to claim 1, wherein the rotation shafts of two adjacent rotating supports are movably connected.

3. The energy concentrating apparatus according to claim 2, further comprising a fastening member, wherein the fastening member is located on the rotation shafts of the two adjacent rotating supports such that the rotation shafts of the two adjacent rotating supports are movably connected.

4. The energy concentrating apparatus according to claim 1, wherein the rotating support is in a cross shape, the rotating support is provided with a through hole, and an upper portion of the linking rod passes through the corresponding through hole.

5. The energy concentrating apparatus according to claim 1, wherein each of the at least one arc-shaped slide rail terminates at the end of a sun pitch angle.

6. An energy concentrating apparatus, comprising:

a mounting platform and at least one set of mounting supports, wherein each set of the at least one set of the mounting supports is located on the mounting platform, and each set of the at least one set of the mounting supports is provided with a ball hole;

at least one arc-shaped slide rail, at least one linking rod, and at least one sliding parts, wherein each of the at least one arc-shaped slide rail is located on the mounting platform, each of the at least one sliding parts is slidably located in a corresponding arc-shaped slide rail, each of the at least one linking rods is provided with a ball, the ball is located in the corresponding ball hole and is rotatable in the ball hole, two ends of each of the at least one linking rod are respectively connected to the sliding parts and a reflective mirror such that the sliding parts drives the reflective mirror to rotate, and curvatures of two adjacent arc-shaped slide rails are different such that each of the at least one reflective mirror rotates towards a different direction to ensure that light reflected by each of the reflective mirror is reflected on an energy concentrating structure; and a drive device and at least one pull rope, wherein each of the at least one pull rope is fixedly connected to a corresponding sliding parts to drive the corresponding sliding parts to slide, each of the at least one pull rope is wound on the corresponding drive device such that the drive device pulls the pull rope to move.

7. The energy concentrating apparatus according to claim 6, wherein each of the at least one arc-shaped slide rail terminates at the end of a sun pitch angle.

* * * * *